UNITED STATES PATENT OFFICE.

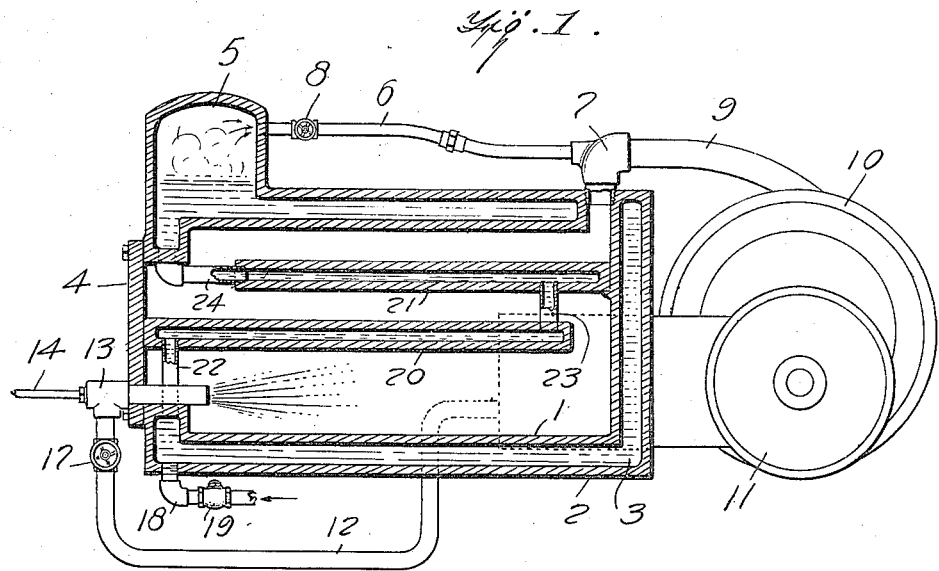
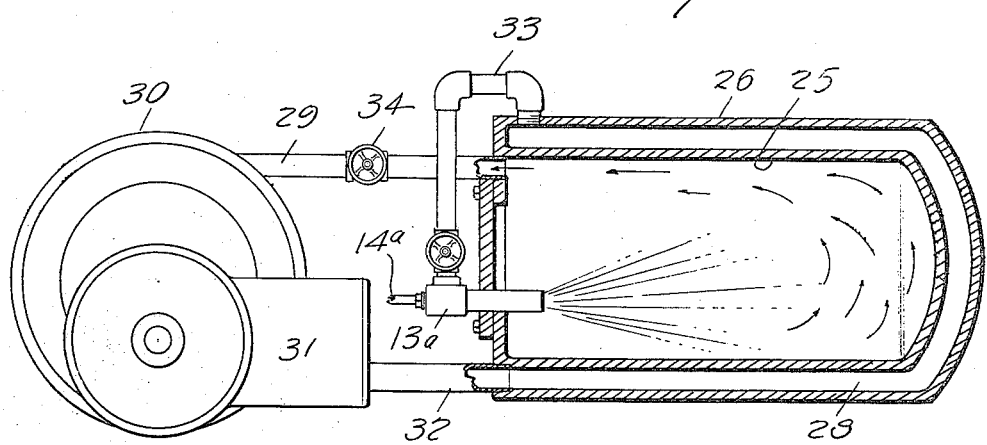
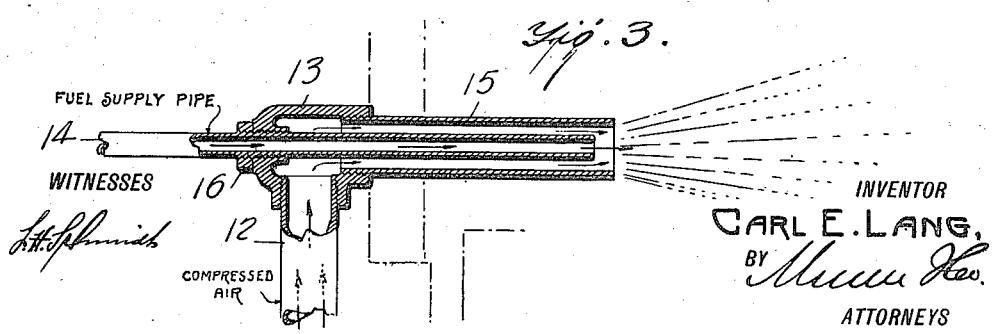

CARL EMIL LANG, OF LIVENGOOD, TERRITORY OF ALASKA.

INTERNAL-COMBUSTION TURBINE.

1,294,120.  Specification of Letters Patent.  Patented Feb. 11, 1919.

Application filed June 5, 1917, Serial No. 173,043. Renewed April 16, 1918. Serial No. 228,834.

*To all whom it may concern:*

Be it known that I, CARL E. LANG, a subject of the Emperor of Germany, and a resident of Livengood, in the Territory of Alaska, have invented a certain new and useful Improvement in Internal-Combustion Turbines, of which the following is a specification.

My invention is an improvement in internal combustion turbines, and has for its object to provide a device of the character specified wherein a separate combustion chamber is provided in which a steady high pressure is maintained during the working of the turbine, and wherein the fuel is admitted continuously, and wherein it is possible to utilize the cheaper fuels as heavy or crude oil, and wherein the heat of radiation from the combustion chamber is utilized to perform useful labor.

In the drawings:

Figure 1 is a vertical section through one embodiment of the invention;

Fig. 2 is a similar view of another embodiment;

Fig. 3 is an enlarged sectional detail of the spray pipe.

In the embodiment of the invention shown in Fig. 1, a casing 1 is provided, having a jacket 2 which forms a chamber 3 surrounding the casing 1, and an opening is provided at one end of the casing extending through the jacket wall and normally closed by a head 4. The chamber 3 communicates with a steam dome 5 at the end adjacent to the head 4, and a pipe 6 leads from the steam dome to an elbow 7 which is connected with the interior of the casing 1. This pipe 6 has a valve 8 interposed in the length thereof for controlling the supply of steam and a pipe 9 leads from the elbow to the turbine, indicated at 10.

An air compressor 11 is arranged adjacent to the turbine and operated thereby. A pipe 12 leads from the air compressor to a T 13 at the outer end of the spray pipe to be described, the said pipe extending through the head 4, and the fuel supply pipe 14 is also connected with the T. This spray pipe, as shown more particularly in Fig. 3, comprises a tubular casing 15, which is threaded into the inner end of the T, and the fuel supply pipe 14 extends through the T and to near the end of the casing 15 remote from the T. The pipe 14 is threaded into the end of the T, and a lock nut 16 is provided for preventing accidental disengagement of the same.

The air from the air compressor entering the T through the pipe 12 passes around the fuel supply pipe to the delivery end of the casing 15, where it breaks up the entering fuel and delivers it into the combustion chamber in a fine spray. The air compressor pipe 12 has interposed in the length thereof a valve 17, and the water supply pipe 18 opens into the chamber 3 at the end adjacent to the head 4, the said pipe having a valve 19 for controlling the same.

Hollow casings 20 and 21 are arranged within the combustion chamber, casing 20 extending from the head 4 to near the opposite end, while the casing 21 extends from the opposite end to near the head 4, and as these casings extend entirely across the combustion chamber, the gases of combustion must pass toward the inner end of the chamber and thence toward the outer end and again toward the inner end before entering the elbow 7. The casing 20 communicates with the chamber 3 by means of a pipe 22 adjacent to the head 4, and the casing 20 communicates with the casing 21 by a pipe 23 at the opposite end. A third pipe 24 leads from that end of the casing 21 adjacent to the head 4 to the chamber just below the steam dome.

In the embodiment of the invention just described, the compressed air entering the combustion chamber carries with it a spray of fuel which, burning, heats the water in the chamber 3 and in the casings 20 and 21, and the steam generated passes from the steam dome to the turbine.

In operation, a mixture of gases of combustion and steam is supplied to the turbine for operating the same, the combustion of the fuel serving to generate the same.

In the embodiment of the invention shown in Fig. 2, a casing is shown having double walls, namely, an inner wall 25 and an outer wall 26 which jackets the wall 25 except at one end of the casing, where an opening is provided, normally closed by a head 27. Thus a chamber 28 is formed between the walls 25 and 26, and the interior of the casing is the combustion chamber. A pipe 29 leads from the combustion chamber at the end adjacent to the head 27 of the turbine 30, and an air compressor 31 communicates with the chamber 28 by means of a pipe 32, the said pipe opening into the chamber 28 at the end adjacent to the head 27 and at the bottom of the casing. A pipe 33 leads from the top of the casing, over the chamber 28, to the T 13ᵃ of the spraying device, which is the same as that shown in Fig. 1, comprising the T 13ᵃ and a tubular casing 15ᵃ, through which extends the fuel supply pipe 14ᵃ. Valves 34 and 35 are interposed in the pipes 29 and 33, respectively, for controlling the said pipes.

In the embodiment of the invention shown in Fig. 2, a uniform pressure is maintained in the chamber 28 by the air compressor, and this pressure is transmitted through the pipe 33 to the spraying tube. The compressed air discharged in the spraying tube breaks up the entering fuel into a fine spray, and delivers it into the combustion chamber, from whence it passes to the turbine. The air in the chamber 28 is heated by the combustion of the fuel, and the chamber is cooled by the air.

I claim:

An internal combustion turbine comprising in combination with a turbine and an air compressor, a casing forming a combustion chamber jacketed at one end and at its side walls, the other end having an opening and a plate for closing the opening, a spray head held by the plate and delivering to the combustion chamber, a pipe leading from the combustion chamber and delivering to the turbine, a pipe leading from the air compressor to the jacket of the combustion chamber, a pipe leading from the jacket and delivering to the spray head, said spray head having connected therewith a fuel supply pipe.

CARL EMIL LANG.

Witnesses:
F. B. ATWELL,
H. J. ATWELL.